US011621962B2

(12) United States Patent
Roedel et al.

(10) Patent No.: US 11,621,962 B2
(45) Date of Patent: Apr. 4, 2023

(54) VIDEO SIGNALING FOR USER VALIDATION IN ONLINE JOIN SCENARIOS

(71) Applicant: MICROSOFT TECHNOLOGY LICENSING, LLC, Redmond, WA (US)

(72) Inventors: Dominic Roedel, Prague (CZ); Neeraj Kumar Jain, Prague (CZ); Yvonne Carola Lohmann, Prague (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 16/928,955

(22) Filed: Jul. 14, 2020

(65) Prior Publication Data

US 2022/0021680 A1    Jan. 20, 2022

(51) Int. Cl.
*H04L 9/40* (2022.01)
*H04N 7/15* (2006.01)
*H04L 12/18* (2006.01)
*H04N 5/232* (2006.01)

(52) U.S. Cl.
CPC ........ *H04L 63/102* (2013.01); *H04L 12/1822* (2013.01); *H04L 63/0861* (2013.01); *H04L 63/104* (2013.01); *H04N 5/23206* (2013.01); *H04N 7/155* (2013.01)

(58) Field of Classification Search
CPC ............... H04L 63/102; H04L 12/1822; H04L 63/0861; H04L 63/104; H04L 63/08; H04L 67/1044; H04N 5/23206; H04N 7/155; H04N 7/15
See application file for complete search history.

(56) References Cited

U.S. PATENT DOCUMENTS

| 7,398,295 | B2 * | 7/2008 | Shoroff ............... H04L 65/4038 709/204 |
| 8,194,841 | B2 * | 6/2012 | Archambault ...... H04L 12/1818 709/204 |
| 8,423,470 | B2 | 4/2013 | Rao et al. |
| 9,407,621 | B2 | 8/2016 | Vakil et al. |
| 9,842,250 | B2 | 12/2017 | Macdonald |

(Continued)

OTHER PUBLICATIONS

Geyer, Werner, et al. "A team collaboration space supporting capture and access of virtual meetings." Proceedings of the 2001 International ACM SIGGROUP Conference on Supporting Group Work. 2001. (Year: 2001).*

(Continued)

*Primary Examiner* — Jung W Kim
*Assistant Examiner* — Sameera Wickramasuriya
(74) *Attorney, Agent, or Firm* — NovoTechIP International PLLC (57) ABSTRACT

An online meeting service is configured to determine whether a prospective meeting participant is among a known group of trusted users (e.g., logged in to a trusted domain). If the prospective meeting participant is validated as a trusted user, they may join a meeting without additional steps. If the prospective meeting participant is not validated as a trusted user, they may consent to have the meeting organizer view them through their camera in order to confirm that they may have meeting access. If the organizer recognizes the prospective participant through the camera image (still or video), the organizer may admit them to the meeting.

20 Claims, 8 Drawing Sheets

(56) References Cited

U.S. PATENT DOCUMENTS

| | | | | |
|---|---|---|---|---|
| 11,240,467 | B1* | 2/2022 | Benson | H04L 12/1818 |
| 2010/0325561 | A1* | 12/2010 | Archambault | H04L 12/1818 |
| | | | | 715/753 |
| 2014/0280595 | A1* | 9/2014 | Mani | H04L 65/403 |
| | | | | 709/204 |
| 2016/0335511 | A1* | 11/2016 | MacDonald | G06F 21/32 |
| 2018/0083978 | A1* | 3/2018 | Pantazelos | G06F 21/6245 |
| 2018/0103074 | A1* | 4/2018 | Rosenberg | H04L 65/403 |
| 2018/0351756 | A1* | 12/2018 | Dave | H04L 12/1818 |
| 2020/0016495 | A1* | 1/2020 | Cruz | H04L 67/38 |
| 2020/0342131 | A1* | 10/2020 | Giralt | H04L 63/102 |
| 2021/0352120 | A1* | 11/2021 | Masi | H04L 65/403 |

OTHER PUBLICATIONS

Bonneau, Joseph, et al. "The quest to replace passwords: A framework for comparative evaluation of web authentication schemes." 2012 IEEE symposium on security and privacy. IEEE, 2012. (Year: 2012).*

"Move Attendees to and from the Lobby in Cisco Webex Meetings", Retrieved from: https://help.webex.com/en-us/nsq9s2h/Move-Attendees-to-and-from-the-Lobby-in-Cisco-Webex-Meetings, Retrieved Date: Feb. 3, 2020, 3 Pages.

"Set options for Online Meetings and Conference Calls—Skype for Business", Retrieved from: https://support.office.com/en-us/article/set-options-for-online-meetings-and-conference-calls-dcd1ca39-0c1f-466c-9573-f04138fef5e2, Retrieved Date: Feb. 3, 2020, 8 Pages.

"Using the Infinity Connect Mobile Clients", Retrieved from: https://docs.pexip.com/clients/using_mobile_app.htm, Retrieved Date: Feb. 3, 2020, 22 Pages.

Zed, Christian B., "Meetings—Far End Camera Control—RingCentral", Retrieved from: https://support.ringcentral.com/s/article/10766-RingCentral-Meetings-Far-end-camera-control-Host?language=en_US, Retrieved Date: Feb. 3, 2020, 2 Pages.

Webster, Darrell, "Invite Anyone into a Microsoft Teams Meeting. No Really. Anyone", Retrieved from: https://regarding365.com/invite-anyone-into-a-microsoft-teams-meeting-no-really-anyone-7f2fd04e3585, Mar. 15, 2018, 13 Pages.

* cited by examiner

VIDEO SIGNALING FOR USER VALIDATION IN ONLINE JOIN SCENARIOS

TECHNICAL FIELD

The present application relates generally to online meetings, and particularly to validating unknown users to join meetings.

BACKGROUND

Videoconferencing is becoming an increasingly common way of conducting business around the globe, allowing users to see one another and to discuss and jointly edit documents without requiring travel or in-person meetings. As this method of working has become more common, however, a need for improved meeting security has arisen. In particular, some individuals have found ways to join online meetings to which they were not invited. These unauthorized meeting participants may be harmless pranksters, but they may also be corporate spies or other types of eavesdroppers who are attempting to gain unauthorized access to conversations and files for competitive advantage. A need therefore exists for a better method of making sure that all participants in an online meeting are authorized to be there.

SUMMARY

In one aspect, a system for adding a user to an online meeting includes a processor and machine-readable media. The machine-readable media include instructions which, when executed by the processor, cause the processor to receive, from a first device, a first signal indicating that a first user of the first device wishes to join an online meeting and determine whether the first user is among a stored group of approved users for joining the online meeting. Upon determining the first user is among the stored group of approved users, the processor automatically admit the first user to the online meeting. The processor also receives, from a second device, a second signal indicating that a second user of the second device wishes to join the online meeting, determines whether the second user is among the stored group of approved users for joining the online meeting, and, upon determining the second user is not among the stored group of approved users, sends a join request signal to a host of the online meeting requesting to allow the second user to join the online meeting. The processor receives a validation request signal from the host of the online meeting in response to the join request signal, and sends a control signal to the second device in response to the validation request signal, the control signal directing the second device to activate a camera to capture a representation of the second user. It receives, from the second device, the captured representation of the second user, sends the captured representation to the host of the online meeting for validation, receives an authentication signal from the host of the online meeting in response to the captured representation, and admits or denies the second user based on the authentication signal.

In another aspect, a method of adding a user to an online meeting includes receiving, from a first device, a first signal indicating that a first user of the first device wishes to join an online meeting; determining whether the first user is among a stored group of approved users for joining the online meeting; upon determining the first user is among the stored group of approved users, automatically admitting the first user to the online meeting; receiving, from a second device, a second signal indicating that a second user of the second device wishes to join the online meeting; determining whether the second user is among the stored group of approved users for joining the online meeting; upon determining the second user is not among the stored group of approved users, sending a join request signal to a host of the online meeting requesting to allow the second user to join the online meeting; receiving a validation request signal from the host of the online meeting in response to the join request signal; sending a control signal to the second device in response to the validation request signal, the control signal directing the second device to activate a camera to capture a representation of the second user; receiving, from the second device, the captured representation of the second user; sending the captured representation to the host of the online meeting for validation; receiving an authentication signal from the host of the online meeting in response to the captured representation; and admitting or denying the second user based on the authentication signal.

In another aspect, a system for adding a user to an online meeting includes means for receiving, from a first device, a first signal indicating that a first user of the first device wishes to join an online meeting; means for determining whether the first user is among a stored group of approved users for joining the online meeting; means for automatically admitting the first user to the online meeting upon determining the first user is among the stored group of approved users; means for receiving, from a second device, a second signal indicating that a second user of the second device wishes to join the online meeting; means for determining whether the second user is among the stored group of approved users for joining the online meeting; means for sending a join request signal to a host of the online meeting requesting to allow the second user to join the online meeting upon determining the second user is not among the stored group of approved users; means for receiving a validation request signal from the host of the online meeting in response to the join request signal; means for sending a control signal to the second device in response to the validation request signal, the control signal directing the second device to activate a camera to capture a representation of the second user; means for receiving, from the second device, the captured representation of the second user; means for sending the captured representation to the host of the online meeting for validation; means for receiving an authentication signal from the host of the online meeting in response to the captured representation; and means for admitting or denying the second user based on the authentication signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As discussed above, when conducting online meetings, hosts may have a technical problem with making sure that all users who request to join are actually supposed to be there. In face-to-face meetings, imposters can generally be readily detected because the organizer recognizes their face. However, in online scenarios, users may attempt to masquerade as others, or on some less-secure platforms, may simply mistype a meeting number and find themselves in a space where they are not authorized to be. This latter case may be more likely in systems where a user may access a meeting using a conference ID and passcode. Depending on the confidentiality of the agenda and of files or working documents that may be shared, this may create a technical problem that meeting security cannot be assured. Current systems allow a user requesting to join an online meeting to type a name, and perhaps to show a profile photo that an organizer may recognize, but these precautions may be easily defeated by a nefarious user, who may simply type in a name of some authorized person, and perhaps even use a profile photo that has been obtained of that person. The present application provides a technical solution of requiring an unknown user requesting to join a meeting to provide a "live" photo or video, which must be recognized by the meeting organizer in order to be admitted to the meeting. In one implementation, a "live" photo or video is one that was captured in response to the user validation request (rather than a saved representation from an earlier time). The solution described herein provides a technical benefit of improved meeting security.

Figure 1:
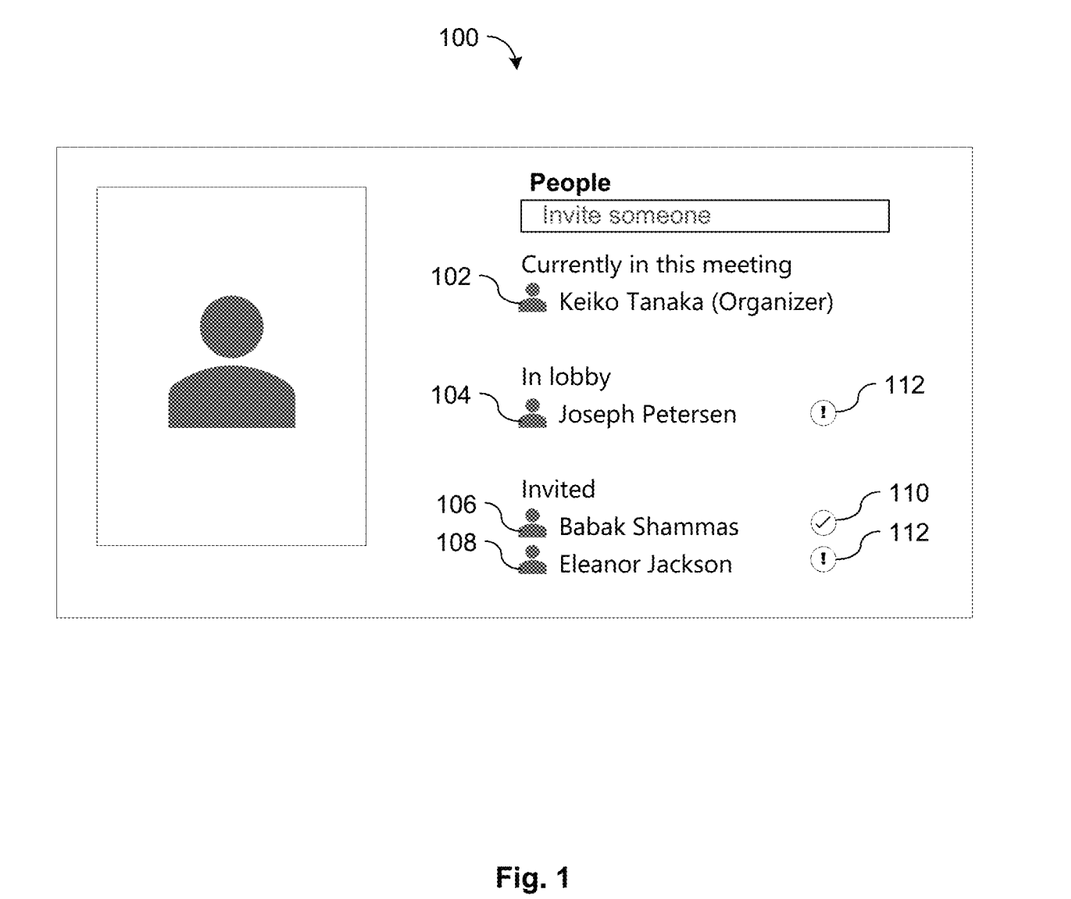
FIG. 1 is a diagram of a user interface (UI) for an organizer of an online meeting.

FIG. 1 is an example user interface (UI) 100 or a host of an online meeting. As shown, the UI 100 is based on the participants list for Microsoft Teams, but it will be understood that the system may be implemented on any online meeting platform or service. One user 102, who is referred to as the "organizer" or "host" of the meeting, is shown as being "Currently in this meeting." The list also shows other users 104, 106, 108 who have been invited to the meeting or who are in the meeting lobby, as further discussed below. Each of these users has a validation icon 110, 112. Icon 110 (a check mark) indicates that the user has been validated into the meeting, while icons 112 (an exclamation point) indicate that the user has not been validated. For example, a system might be configured so that by default, a person who is logged into an account within the same organization as the host is considered to have been validated. Other validation criteria are also possible, such as people holding a unique passcode for the meeting, validation via SMS-based or voice-based authentication, people belonging to a selected group of organizations or people whose faces appear to match an entry in face directory, or people using RSA token devices or apps. It is preferred that a user must have offered some kind of authentication credentials in order to be considered to be "validated," such as logging in to an account (rather than, for example, simply having typed in a name or an email address). This account may be the online meeting service itself, but it may also be another password protected account.

When a user attempts to join the meeting, the online meeting service (also referred to herein as the "online meeting platform") checks to see if the user is validated. If so, the user is joined to the meeting without requiring any additional information. For example, user 106 as shown in FIG. 1 who was invited to the meeting is shown as being validated (as indicated by check mark 110). When user 106 attempts to join the illustrated meeting, the online meeting service will place the user directly into the meeting. The illustrated entry for user 106 will move to the "Currently in this meeting" group, and video and/or audio for the meeting will flow between user 106 and the others in the meeting (at the time illustrated, only organizer 102 is admitted to the meeting).

If a user who is not logged into the online meeting service but who enters the same identifying information (e.g., some combination of name, email address, and/or profile photo) into the system as user 106 attempts to join the meeting, the service will attempt to validate them. For example, user 104, who is not validated, has attempted to enter the meeting. The online meeting service has recognized that user 104 is not validated (for example, by seeing that user 104 has not yet logged into the online meeting service using credentials from an allowed domain), and so has placed them in an online "lobby" as shown. Users in the lobby group may not access video, audio, or files from the meeting, and (in contrast to physical lobbies in offices) they may not be able to see or interact with one another while they are in the lobby. Online lobbies are known in videoconferencing systems, and typically the host must make an affirmative decision to admit a user to the meeting from the lobby. In known systems, the user usually offers a name, an email address, a profile photo, or some other identifying information, which is accessible to the meeting organizer when they decide whether to admit the user, to leave them in the lobby, or to remove them from the connection entirely. In some systems, it is possible for the user in the lobby to be entirely anonymous, with no identifying information offered. However, previous systems typically do not check whether any offered information is accurate. Thus, the previous systems suffer from the technical problem of allowing a user into a meeting by entering a meeting ID and passcode, a name, an email address, and/or a profile photo of a different user. As such, the security of the previous systems may be compromised.

Figure 2:
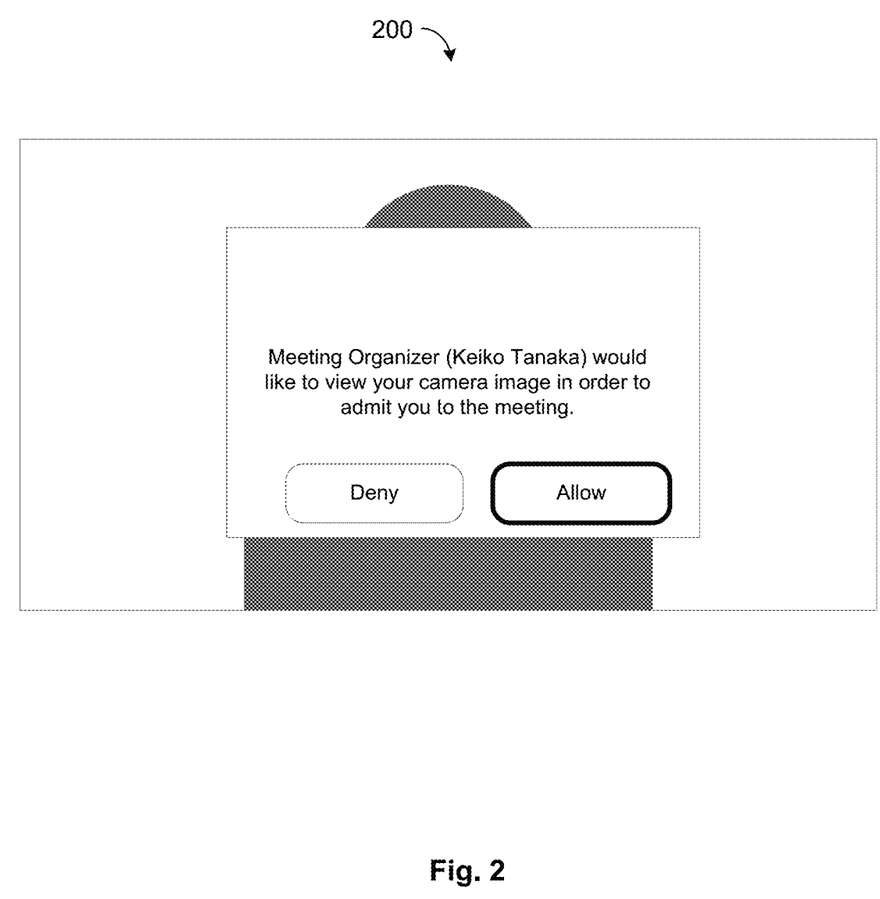
FIG. 2 is a diagram of a UI for a an unvalidated user attempting to enter an online meeting.

In the system described herein, when user 104 is not validated and attempts to join the meeting, the system places them in the lobby, and then requests that user 104 give permission for the meeting host to view a still or video image from a device camera (or another appropriately recognizable representation of the user, such as a voice sample). An example of a dialog 200 requesting this permission is shown in FIG. 2. In FIG. 2, the name of meeting organizer 102 is displayed to user 104, but in other implementations, this name may not be displayed to the joining user. Once user 104 gives permission, a representation of them such as a still or video image from their camera is sent to meeting organizer 102. This process is shown in more detail below in connection with FIG. 3. Host 102 can then check that the camera image actually matches the known physical appearance of the person that is expected in the meeting. If so, the organizer 102 may authorize the online meeting service permission to place user 104 in the meeting. If the camera image does not match the person that is expected in the meeting, the organizer 102 may direct the system to disconnect them, may simply leave them in the lobby, where user 104 cannot access any meeting content, or may message with user 104 via text or via video in order to discuss the lack of matching.

As shown in FIG. 1, user 108 has been invited to the meeting, but is not validated. This means that the user 108 is not within an allowed group of users (such as users currently logged on to the online meeting service or to another trusted system), so when they attempt to join the meeting, they will see the dialog shown in FIG. 2 and will have to have their representation checked by the organizer before they can join the meeting, even if they are logged into the online meeting service. This configuration may be found in a system that has more stringent requirements for validation, such as a system where validated users must be signed into the same domain as the meeting organizer. In this scenario, user 108 may be, for example, a contractor using a different domain, who then must be visually or otherwise checked by the meeting organizer before being admitted to the meeting.

Figure 3:
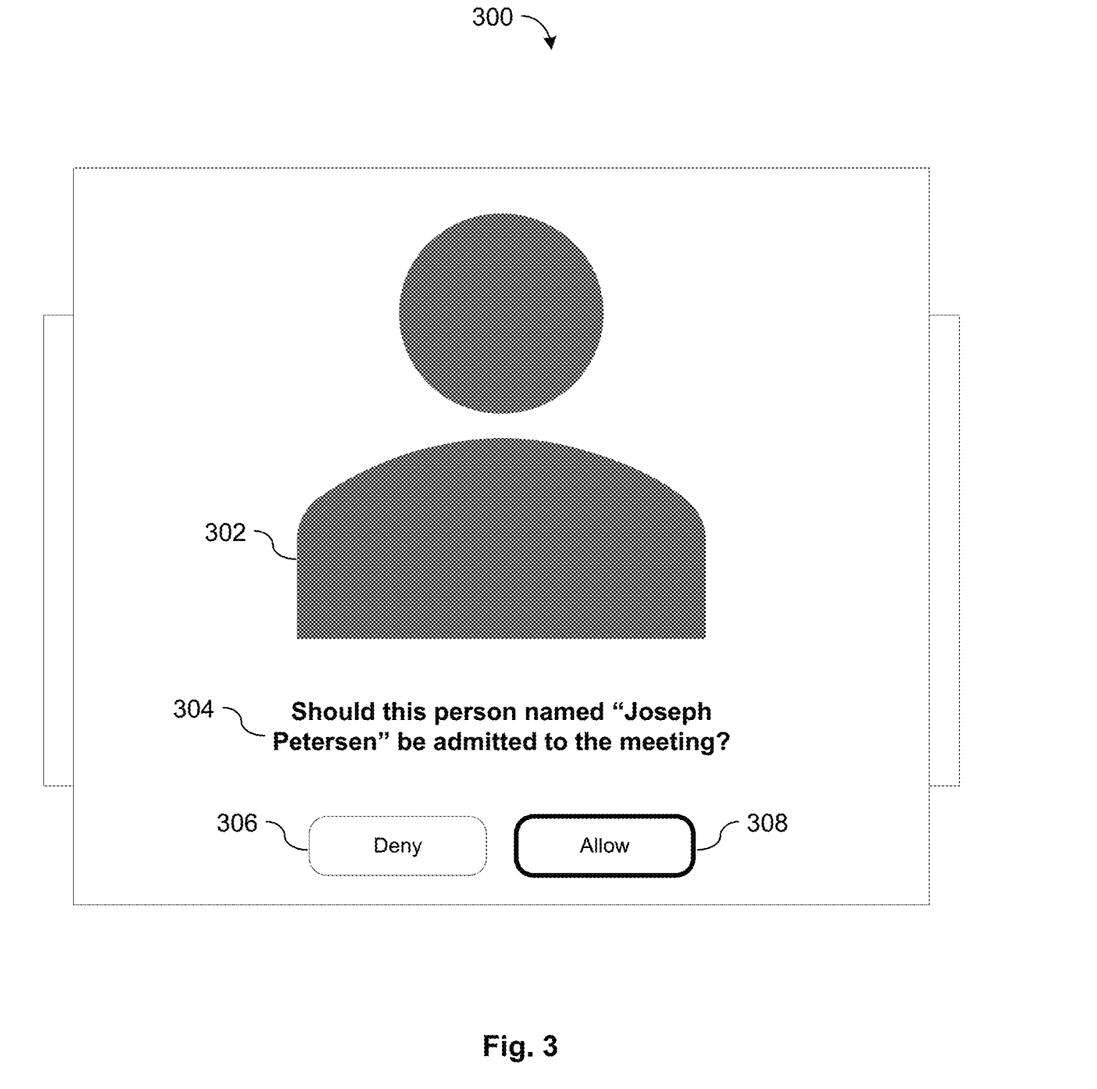
FIG. 3 is a diagram of a UI for a meeting organizer to check an identity of an unvalidated user.

FIG. 3 is an example user interface 300 for meeting organizer 102 to check the representation of user 104. Meeting organizer 102 is presented with a dialog box showing the captured representation 302 of user 104, and the window displays a question 304 about whether the captured representation 302 matches user 104. The representation 302 may be a still image, a video image, or another representation (for example, in some implementations, rather than or in addition to being presented with an image, meeting organizer 102 may be presented with an audio sample of the voice of user 104). Viewing this window, meeting organizer 102 may deny admission to user 104 using button 306, or grant admission using button 308. It will of course be understood that other controls besides buttons may be used to perform this function. If admission is denied with button 306, in some implementations, user 104 may be left in the online meeting lobby, while in other implementations, user 104 may be disconnected from the meeting. Some implementations may offer two buttons or equivalent controls in place of deny button 306, giving the meeting organizer a choice of whether to leave user 104 in the online meeting lobby or to remove them from the meeting entirely. In some implementations, user 104 may be told that meeting organizer 102 has denied them admission, while in other implementations, no notice may be sent to user 104 that they have been denied admission. If admission is granted with button 308, user 104 may optionally be notified that they have been granted admission, but they may also simply be placed in the meeting without notification.

Figure 4:
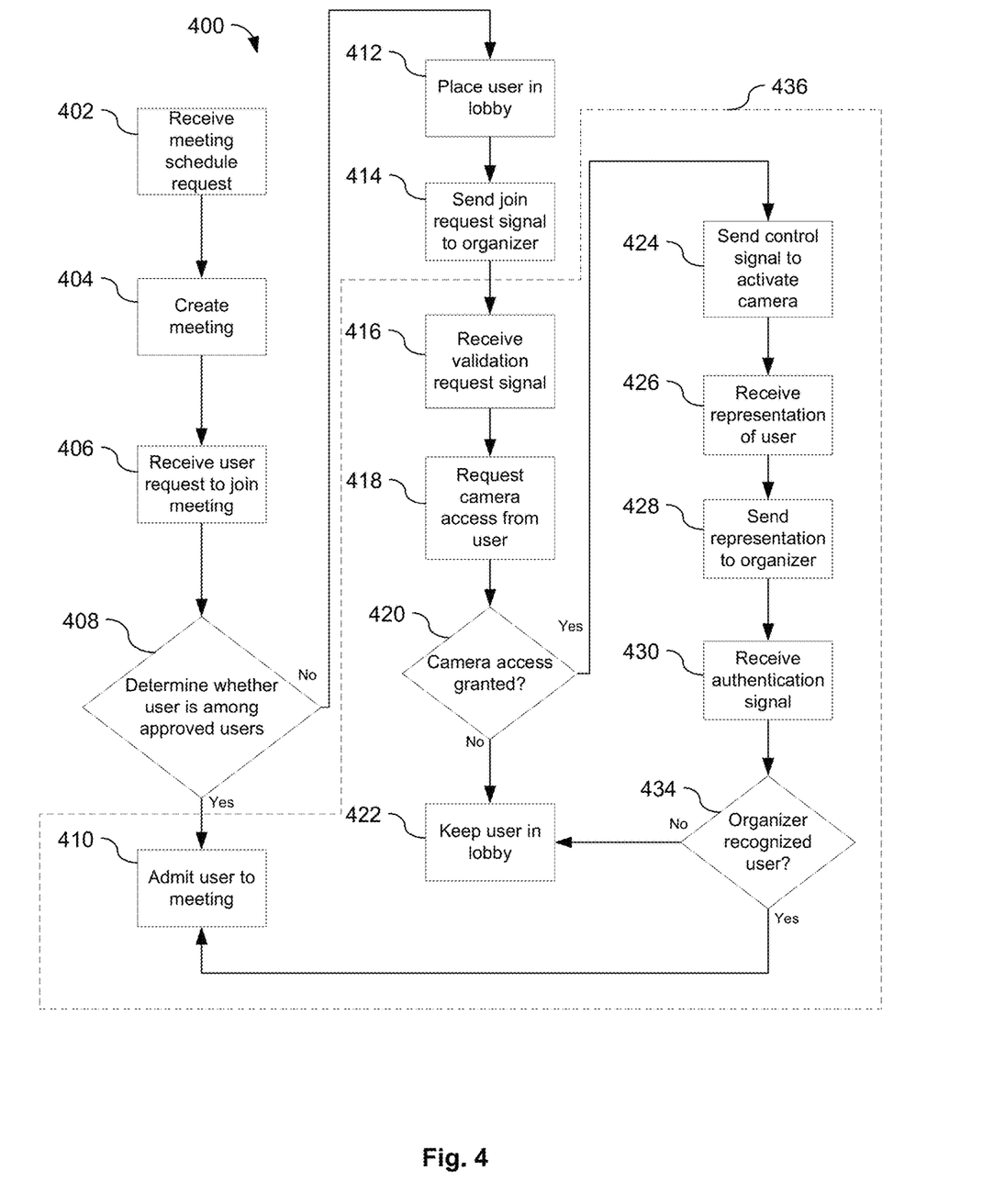
FIG. 4 is a process flow showing steps for admitting an unvalidated user into an online meeting.

FIG. 4 is a flow chart 400 showing the process of adding a user to an online meeting. The flow chart 400 starts with two preliminary steps. The online meeting service receives a request from the meeting organizer to schedule a meeting (step 402). The request may optionally include a list of other participants in the requested meeting, a schedule for the meeting, files that may be shared during the meeting, or other known parameters for online meetings. In response to the meeting request, the online meeting service creates the meeting (step 404). It will be understood that the meeting may be an ad hoc meeting, which will be created by the service upon receipt of the request, or may be a meeting scheduled to occur at a later time, in which case the service will create the meeting at an appropriate time before the scheduled start time.

After the meeting has begun, the online meeting service receives a join request from a user (step 406). The user may have received a meeting invitation from the organizer or may have obtained identifying information for the meeting from some other source (e.g., a public invitation or an invitation forwarded from an invitee). Identifying information for the meeting may include, for example, a conference ID and a passcode to enter the meeting. Upon receiving the request to join, the service checks to see if the requesting user is part of an approved group of users (i.e., checks to see if the requesting user is validated) (step 408). As discussed above in connection with FIG. 1, validation may require that the user be logged in to a particular domain, be verified by a facial-recognition scheme, or other appropriate tests. In some implementations, possession of a conference ID and a passcode for the meeting may not be considered to be sufficient to validate the user without other validating characteristics, such as being logged in to the online meeting service or to another trusted system. If the user is validated (step 408, Yes), the service places the user in the meeting (step 410) and the process terminates.

If the user is not validated (step 408, No), the online meeting service places them in a meeting lobby (step 412). As discussed above, the lobby is a holding area which is not allowed to receive audio or video from the main meeting. In the back end of the online meeting service (hidden from all users), users in the lobby may technically be connected to the meeting, but with no communication between the lobby and the main meeting. The meeting organizer has access to a list of potential meeting participants in the lobby, as shown above in FIG. 1 (e.g., user 104). In some implementations, the online meeting service sends the meeting organizer an affirmative notification that a new unvalidated user has been placed in the lobby, while in other implementations, notification to the meeting organizer is by placement of the new unvalidated user on the viewable list of people in the lobby. In either case, this notification from the online meeting service serves as a join request signal (step 414), inviting the organizer to request to admit the user to the meeting. When the online meeting service receives a validation request signal from the meeting organizer to approve a user in the lobby for admission to the meeting (step 416), the online meeting service sends a request to the unvalidated user to access their camera (step 418). The service may receive a denial of this request (step 420, No), in which case the user remains in the meeting lobby (step 422). In some implementations (not separately illustrated), the service may remove a user who denies access to the camera instead of leaving them in the lobby. In some implementations (not separately illustrated), the step of requesting access may be skipped and the online meeting service may simply send a control signal to the camera of the device of the unvalidated user to capture a representation of the user as discussed below. It is generally preferred, however, that the user be given an option to opt out of image capture before the online meeting service directs a camera to capture the user's image. In some implementations, this step may occur at the time that the unvalidated user accesses the online meeting service, at the time that the user is placed in the lobby, or at another appropriate time in the meeting join process.

When the online meeting service receives permission to access the user's camera (step 420, Yes), it sends a control signal to direct the camera to capture a representation of the user (e.g., a still or video image) (step 424). Use of a control signal at this stage of the process helps to ensure that the online meeting service is receiving a "live" image of the user, instead of a previously captured representation. The online meeting service receives the representation (step 426) and sends it to the meeting organizer (step 428). In response, the online meeting service receives an authentication signal from the meeting organizer indicating whether the representation appears to match the expected user (step 430). If the authentication signal confirms that the user appears to be the expected user (step 434, Yes), the service joins the user to the online meeting (step 410). If the authentication signal indicates that the captured representation does not appear to be the expected user (step 434, No), then the service leaves the user in the lobby (step 422). As discussed above in connection with consenting to camera access, in some implementations, rather than leaving the user in the lobby, the online meeting service may disconnect them from the meeting entirely at this point. In some implementations (not illustrated), the user may be informed that the organizer does not recognize them so that they may offer further proof of their entitlement to participate in the meeting, while in other implementations (not illustrated), they may receive no separate notice but are simply left in the meeting lobby.

The technical solution described with respect to the process flow 400 has a technical advantage of increasing meeting security as compared to prior methods of allowing users to join online meetings. However, it may not be fully effective in situations where, for example, an unauthorized user is able to defeat direct control of their camera and offers a prerecorded representation of an authorized user to the online meeting service, thereby misleading the meeting organizer into allowing the unauthorized user into the meeting. To address this technical problem, some implementations may provide additional security features as described below.

Figure 5:
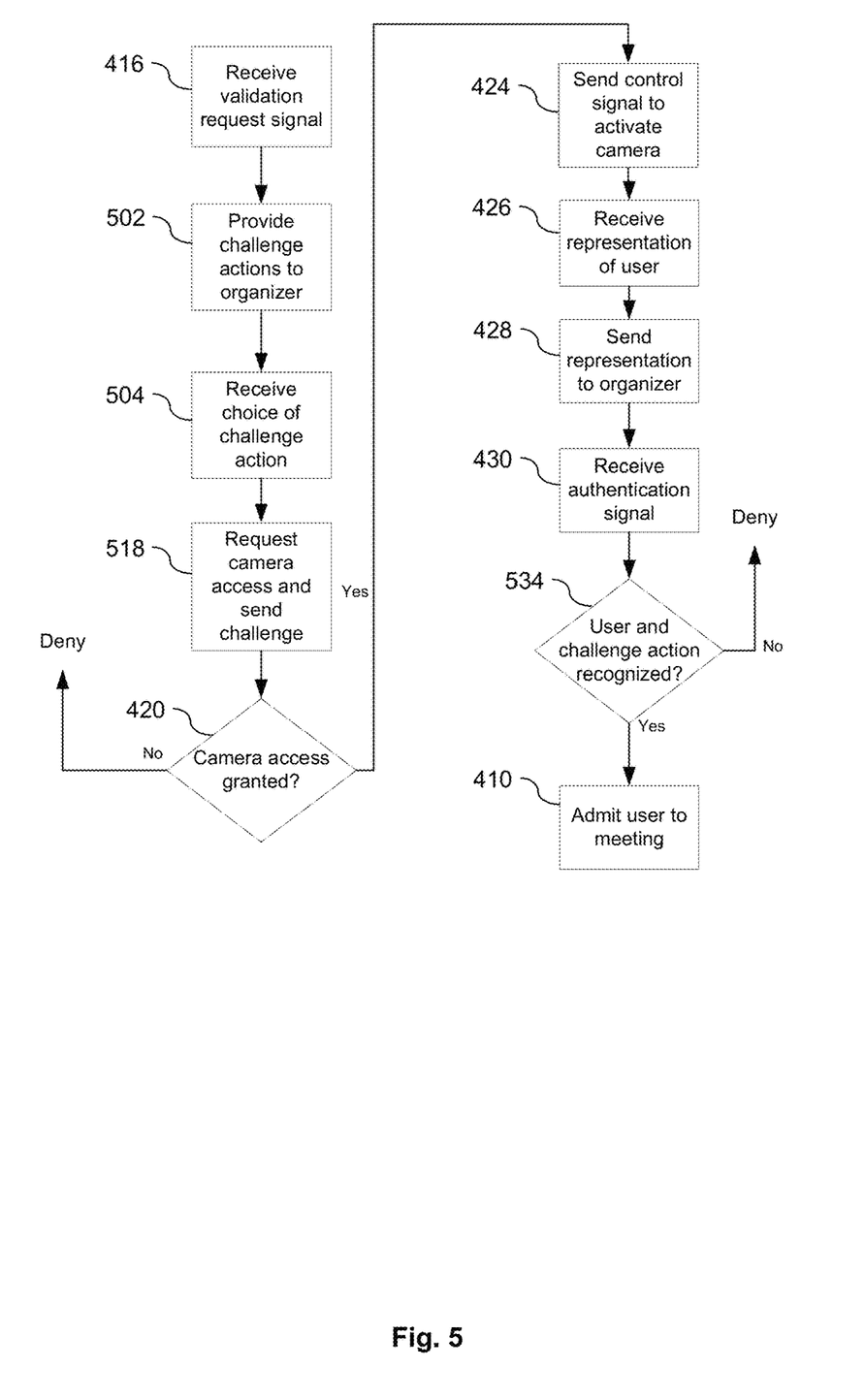
FIG. 5 shows a portion of the process flow shown in FIG. 4, with additional steps inserted and/or changed to add an additional security feature.
Figure 6:
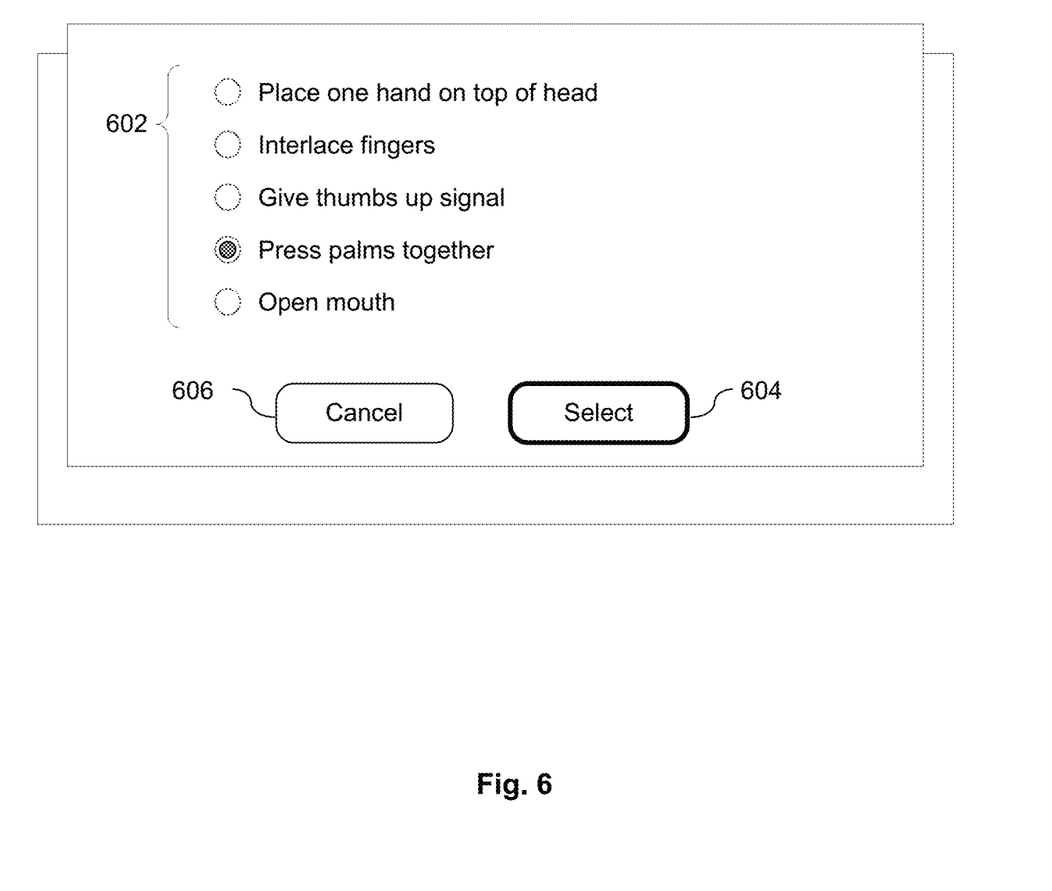
FIG. 6 is a diagram of a UI offering a meeting organizer a list of challenge actions that an unvalidated user may be requested to perform.

FIG. 5 shows another implementation for performing steps within dashed line 436 as shown in FIG. 4. In this implementation, when the online meeting service receives a validation request signal from the meeting organizer to approve admission of the unvalidated user (step 416), the online meeting service provides a list of possible physical challenge actions that the organizer may request the user perform on camera (step 502). For example, a sample list is shown in FIG. 6. The meeting organizer may use radio buttons 602, select button 604, and cancel buttons 606 to select a physical action that user will be requested to perform in front of their camera. The selected challenge action is received by the online meeting service (step 504). The list items may be randomly selected from a list of physical actions stored remotely by the online meeting service. In some implementations, the meeting organizer may have the option of inputting a custom action to request the user to perform.

Returning to FIG. 5, the online meeting service requests camera access as described above in step 418, but also passes to the unvalidated user the challenge action selected by the meeting organizer (step 518). In response to the camera access request, the service receives a grant/deny choice from the user (step 520). If camera access was granted (step 520, Yes), the online meeting service sends a control signal to the user's camera (step 524). The camera captures a representation of the user which is received by the online meeting service (step 526). In this implementation, the captured representation is expected to include the user performing the selected challenge action. The online meeting service then sends the representation to the organizer (step 528). The organizer must not only determine that the representation is the user as in step 428 in FIG. 4, but also that the depicted user is performing the selected challenge action. The meeting organizer may be reminded of this action by displaying it with the representation in a dialog like that shown in FIG. 3. For example, text 304 might be modified in this implementation to read, "Is <user name> placing one hand on their head in this video?" The online meeting service receives an authentication signal reflecting the organizer's choice (step 530) If the authentication signal confirms the identity and action of the user (step 534, Yes), the online meeting service places the user into the meeting (step 510). If the authentication signal indicates that the captured representation does not appear to be the expected user (step 534, No), then the service leaves the user in the lobby (step 522). As discussed above in connection with consenting to camera access, in some implementations, rather than leaving the user in the lobby, the online meeting service may disconnect them from the meeting entirely at this point.

By requiring the user not only to provide a representation of their face but to also perform an action, the technical solution shown in FIG. 5 provides a technical advantage of making it more difficult to insert a prerecorded representation in order to masquerade as the user, increasing security of the online meeting service. Having the possible actions be chosen by the online meeting service provides an additional technical advantage of increasing the randomness of the system, making it more difficult for a nefarious user to defeat by social engineering. In addition, when the service selects a set of actions for the meeting host to choose from, it may be easier to avoid requiring user to perform offensive gestures (whether unintentionally or intentionally). For example, the "thumbs up" gesture that appears in FIG. 6 may be considered offensive in some cultures, while pressing the palms together may be considered profane in others. The online meeting service may in some implementations omit choices such as these from randomly generated lists, in order to avoid discomfort for users and/or meeting organizers. Stored lists of challenge actions may be vetted by human designers, and if appropriate, probable locations of all users participating in the meeting (determined using user profiles, IP addresses, or the like) may be used to remove inappropriate challenge actions. In some implementations, the online meeting service may also be aware of disability restrictions for specific users and may tailor lists of gestures accordingly (for example, not offering the "press palms together" choice to the meeting organizer if the unvalidated user is known to have only one hand). The online meeting service may also provide a step (not shown) of permitting the user to indicate that the user is unable or unwilling to perform the selected action and requesting that a different action be selected by the meeting organizer.

In some implementations, rather than using the process described above for confirmation of participant identities during the process of joining a meeting, the online meeting service may use substantially the same process to confirm identity after a user has joined a meeting but before they access other meeting functions, such as chat, file sharing, screen sharing, or audio participation. This addition might be preferred, for example, for meetings that are open to the public, where any user may join the meeting to watch, but only vetted users are permitted to speak or to access working files.

Figure 7:
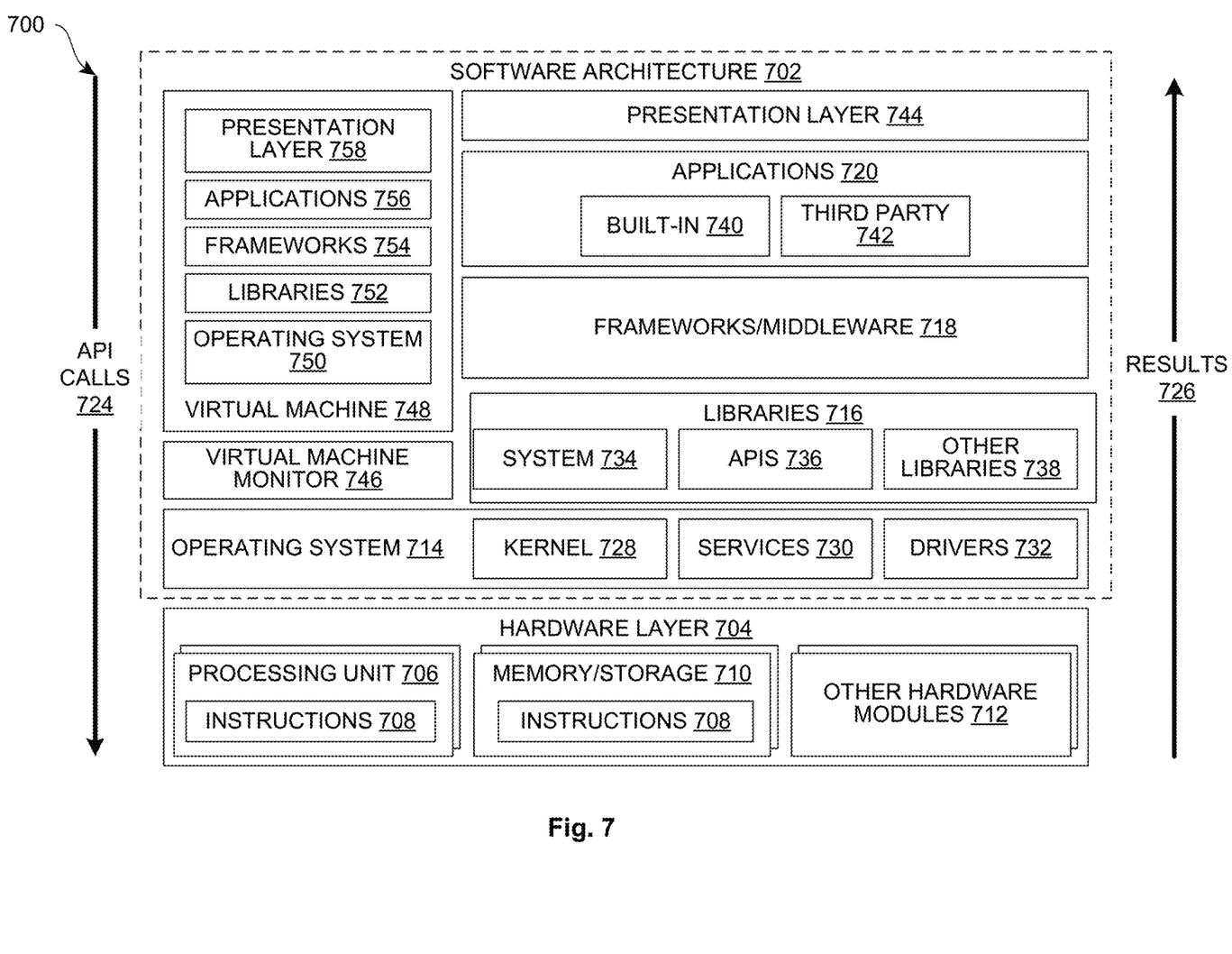
FIG. 7 is a block diagram of an example computing device, which may be used to provide implementations of the systems and methods described herein.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as the cloud service running the methods of FIG. 4 or FIG. 5 that may include, among other things, document storage, processors, memory, and input/output (I/O) components. A representative hardware layer 704 is illustrated and can represent, for example, the devices described herein. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine. The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
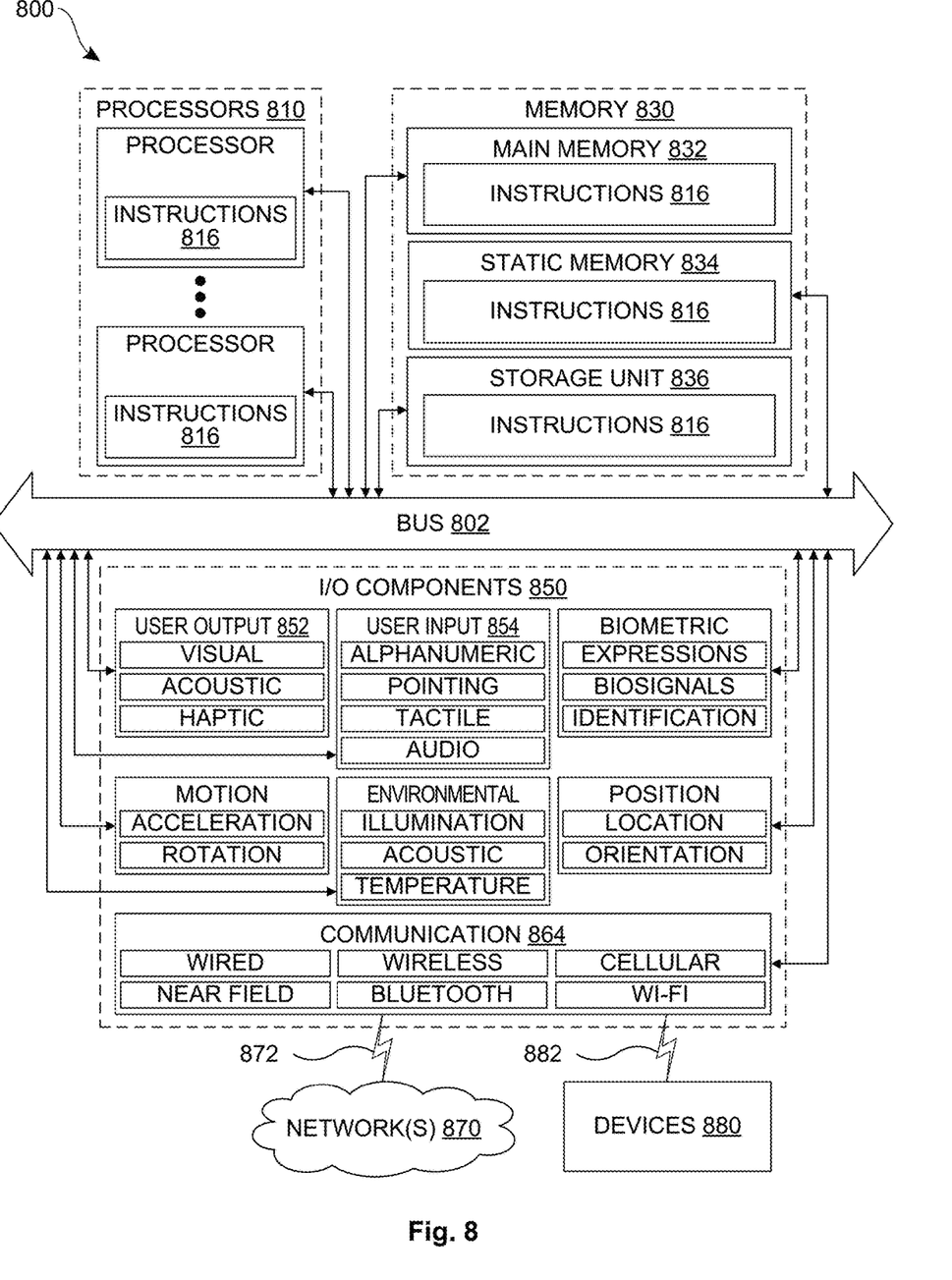
FIG. 8 is a block diagram illustrating components of an example machine configured to read instructions from a machine-readable medium.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine (for example, providing a network service such as the online meeting service described herein) or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854.

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1: A system for adding a user to an online meeting, the system including a processor and machine-readable media including instructions which, when executed by the processor, cause the processor to receive, from a first device, a first signal indicating that a first user of the first device wishes to join an online meeting; determine whether the first user is among a stored group of approved users for joining the online meeting; upon determining the first user is among the stored group of approved users, automatically admit the first user to the online meeting; receive, from a second device, a second signal indicating that a second user of the second device wishes to join the online meeting; determine whether the second user is among the stored group of approved users for joining the online meeting; upon determining the second user is not among the stored group of approved users, send a join request signal to a host of the online meeting requesting to allow the second user to join the online meeting; receive a validation request signal from the host of the online meeting in response to the join request signal; send a control signal to the second device in response to the validation request signal, the control signal directing the second device to activate a camera to capture a representation of the second user; receive, from the second device, the captured representation of the second user; send the captured representation to the host of the online meeting for validation; receive an authentication signal from the host of the online meeting in response to the captured representation; and admit or deny the second user based on the authentication signal.

Item 2: The system of item 1, wherein the join request signal includes identity information provided by the second user.

Item 3: The system of item 1 or 2, wherein the instructions, when executed by the processor, further cause the processor to place the second user in a virtual lobby after receiving the second signal and before admitting or denying the second user, wherein the virtual lobby is configured not to exchange information with the online meeting.

Item 4: The system of any of items 1-3, wherein the authentication signal includes instructions to leave the second user in the virtual lobby.

Item 5: The system of any of items 1-4, wherein the authentication signal includes instructions to disconnect the second user.

Item 6: The system of any of items 1-5, wherein the representation of the second user is a video image.

Item 7: The system of any of items 1-6, wherein the representation of the second user is a still image.

Item 8: The system of any of items 1-7, wherein the instructions, when executed by the processor, further cause the processor to send a challenge request to the second device, wherein the challenge request includes a direction to perform an action that will be captured in the captured representation of the second user.

Item 9: The system of any of items 1-8, wherein the instructions, when executed by the processor, further cause the processor to, before sending a control signal to the second device in response to the validation request signal, request permission from the second user to activate the camera.

Item 10: A method of adding a user to an online meeting, including receiving, from a first device, a first signal indicating that a first user of the first device wishes to join an online meeting; determining whether the first user is among a stored group of approved users for joining the online meeting; upon determining the first user is among the stored group of approved users, automatically admitting the first user to the online meeting; receiving, from a second device, a second signal indicating that a second user of the second device wishes to join the online meeting; determining whether the second user is among the stored group of approved users for joining the online meeting; upon determining the second user is not among the stored group of approved users, sending a join request signal to a host of the online meeting requesting to allow the second user to join the online meeting; receiving a validation request signal from the host of the online meeting in response to the join request signal; sending a control signal to the second device in response to the validation request signal, the control signal directing the second device to activate a camera to capture a representation of the second user; receiving, from the second device, the captured representation of the second user; sending the captured representation to the host of the online meeting for validation; receiving an authentication signal from the host of the online meeting in response to the captured representation; and admitting or denying the second user based on the authentication signal.

Item 11: The method of item 10, wherein the join request signal includes identity information provided by the second user.

Item 12: The method of item 10 or 11, further including placing the second user in a virtual lobby after receiving the second signal and before admitting or denying the second user, wherein the virtual lobby is configured not to exchange information with the online meeting.

Item 13: The method of any of items 10-12, wherein the authentication signal includes instructions to leave the second user in the virtual lobby.

Item 14: The method of any of items 10-13, wherein the authentication signal includes instructions to disconnect the second user.

Item 15: The method of any of items 10-14, wherein the representation of the second user is a video image.

Item 16: The method of any of items 10-15, wherein the representation of the second user is a video image.

Item 17: The method of any of items 10-16, further including sending a challenge request to the second device, wherein the challenge request includes a direction to perform an action that will be captured in the captured representation of the second user.

Item 18: The method of any of items 10-17, further including requesting permission from the second user to activate the camera before sending a control signal to the second device in response to the validation request signal.

Item 19: A system for adding a user to an online meeting, the system including means for receiving, from a first device, a first signal indicating that a first user of the first device wishes to join an online meeting; means for determining whether the first user is among a stored group of approved users for joining the online meeting; means for automatically admitting the first user to the online meeting upon determining the first user is among the stored group of approved users; means for receiving, from a second device, a second signal indicating that a second user of the second device wishes to join the online meeting; means for determining whether the second user is among the stored group of approved users for joining the online meeting; means for sending a join request signal to a host of the online meeting requesting to allow the second user to join the online meeting upon determining the second user is not among the stored group of approved users; means for receiving a validation request signal from the host of the online meeting in response to the join request signal; means for sending a control signal to the second device in response to the validation request signal, the control signal directing the second device to activate a camera to capture a representation of the second user; means for receiving, from the second device, the captured representation of the second user; means for sending the captured representation to the host of the online meeting for validation; means for receiving an authentication signal from the host of the online meeting in response to the captured representation; and means for admitting or denying the second user based on the authentication signal.

Item 20: The system of item 19, wherein the representation of the second user is a video image.

While various implementations have been described, the description is intended to be exemplary, rather than limiting, and it is understood that many more implementations are possible that are within the scope of this document. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for adding a user to an online meeting, the system comprising:
   a processor; and
   machine-readable media including instructions which, when executed by the processor, cause the processor to:
      receive, from a first device, a first signal indicating that a first user of the first device wishes to join an online meeting;
      determine whether the first user is among a stored group of approved users for joining the online meeting;
      upon determining the first user is among the stored group of approved users, automatically admit the first user to the online meeting;
      receive, from a second device, a second signal indicating that a second user of the second device wishes to join the online meeting;
      determine whether the second user is among the stored group of approved users for joining the online meeting;
      upon determining the second user is not among the stored group of approved users, send a join request signal to a device of a host user of the online meeting requesting to allow the second user to join the online meeting;
      receive a validation request signal from the device of the host user of the online meeting in response to the join request signal;
      send a control signal to the second device in response to the validation request signal, the control signal directing the second device to activate a camera to capture a representation of the second user;
      receive, from the second device, the captured representation of the second user;
      send the captured representation to the host user of the online meeting for validation;
      receive an authentication signal from the device of the host user of the online meeting in response to the captured representation of the second user; and
      admit or deny the second user based on the authentication signal.

2. The system of claim 1, wherein the join request signal includes identity information provided by the second user.

3. The system of claim 1, wherein the instructions, when executed by the processor, further cause the processor to place the second user in a virtual lobby after receiving the second signal and before admitting or denying the second user, wherein the virtual lobby is configured not to exchange information with the online meeting.

4. The system of claim 3, wherein the authentication signal includes instructions to leave the second user in the virtual lobby.

5. The system of claim 1, wherein the authentication signal includes instructions to disconnect the second user.

6. The system of claim 1, wherein the representation of the second user is a video image.

7. The system of claim 1, wherein the representation of the second user is a still image.

8. The system of claim 1, wherein the instructions, when executed by the processor, further cause the processor to send a challenge request to the second device, wherein the challenge request includes a direction to perform an action that will be captured in the captured representation of the second user.

9. The system of claim 1, wherein the instructions, when executed by the processor, further cause the processor to, before sending the control signal to the second device in response to the validation request signal, request permission from the second user to activate the camera.

10. A method of adding a user to an online meeting, comprising:
- receiving, from a first device, a first signal indicating that a first user of the first device wishes to join an online meeting;
- determining whether the first user is among a stored group of approved users for joining the online meeting;
- upon determining the first user is among the stored group of approved users, automatically admitting the first user to the online meeting;
- receiving, from a second device, a second signal indicating that a second user of the second device wishes to join the online meeting;
- determining whether the second user is among the stored group of approved users for joining the online meeting;
- upon determining the second user is not among the stored group of approved users, sending a join request signal to a host user of the online meeting requesting to allow the second user to join the online meeting;
- receiving a validation request signal from the host user of the online meeting in response to the join request signal;
- sending a control signal to the second device in response to the validation request signal, the control signal directing the second device to activate a camera to capture a representation of the second user;
- receiving, from the second device, the captured representation of the second user;
- sending the captured representation to the host user of the online meeting for validation;
- receiving an authentication signal from the host user of the online meeting in response to the captured representation; and
- admitting or denying the second user based on the authentication signal.

11. The method of claim 10, wherein the join request signal includes identity information provided by the second user.

12. The method of claim 10, further comprising placing the second user in a virtual lobby after receiving the second signal and before admitting or denying the second user, wherein the virtual lobby is configured not to exchange information with the online meeting.

13. The method of claim 12, wherein the authentication signal includes instructions to leave the second user in the virtual lobby.

14. The method of claim 10, wherein the authentication signal includes instructions to disconnect the second user.

15. The method of claim 10, wherein the representation of the second user is a video image.

16. The method of claim 10, wherein the representation of the second user is a still image.

17. The method of claim 10, further comprising sending a challenge request to the second device, wherein the challenge request includes a direction to perform an action that will be captured in the captured representation of the second user.

18. The method of claim 10, further comprising requesting permission from the second user to activate the camera before sending the control signal to the second device in response to the validation request signal.

19. A system for adding a user to an online meeting, the system comprising:
- means for receiving, from a first device, a first signal indicating that a first user of the first device wishes to join an online meeting;
- means for determining whether the first user is among a stored group of approved users for joining the online meeting;
- means for automatically admitting the first user to the online meeting upon determining the first user is among the stored group of approved users;
- means for receiving, from a second device, a second signal indicating that a second user of the second device wishes to join the online meeting;
- means for determining whether the second user is among the stored group of approved users for joining the online meeting;
- means for sending a join request signal to a host user of the online meeting requesting to allow the second user to join the online meeting upon determining the second user is not among the stored group of approved users;
- means for receiving a validation request signal from the host user of the online meeting in response to the join request signal;
- means for sending a control signal to the second device in response to the validation request signal, the control signal directing the second device to activate a camera to capture a representation of the second user;
- means for receiving, from the second device, the captured representation of the second user;
- means for sending the captured representation to the host user of the online meeting for validation;
- means for receiving an authentication signal from the host user of the online meeting in response to the captured representation; and
- means for admitting or denying the second user based on the authentication signal.

20. The system of claim 19, wherein the representation of the second user is a video image.

* * * * *